United States Patent [19]
Ebner et al.

[11] 3,891,729
[45] June 24, 1975

[54] DEVICE FOR AERATING LIQUIDS

[75] Inventors: Heinrich Ebner, Bonn-Ippendorf; Anton Enenkel, Bonn-Roettgen, both of Germany

[73] Assignee: Firma Heinrich Frings, Bonn, Germany

[22] Filed: Aug. 31, 1973

[21] Appl. No.: 393,439

[30] Foreign Application Priority Data
Sept. 1, 1972 Germany............................ 2243161

[52] U.S. Cl.................................. 261/87; 261/93
[51] Int. Cl................................................. B01f 3/04
[58] Field of Search........................... 261/87, 93

[56] References Cited
UNITED STATES PATENTS

| | | | |
|---|---|---|---|
| 2,191,739 | 2/1940 | Bean................................ | 261/87 X |
| 2,987,186 | 6/1961 | Burgoon et al. ................... | 261/87 X |
| 3,108,146 | 10/1963 | Gross................................ | 261/93 X |
| 3,682,314 | 8/1972 | Blatter............................ | 261/93 X |
| 3,814,396 | 6/1974 | Di Gregorio et al............. | 261/87 X |

FOREIGN PATENTS OR APPLICATIONS
724,791    2/1955    United Kingdom.................. 261/87

*Primary Examiner*—Frank W. Lutter
*Assistant Examiner*—William Cuchlinski, Jr.
*Attorney, Agent, or Firm*—Norbert P. Holler

[57] ABSTRACT

A device for aerating liquids includes a hollow vaned rotor arranged at the bottom of a tank for rotation about a vertical axis and having at the leading side of each vane a vertical imperforate impeller surface inclined non-radially away from the direction of rotation and at the trailing side an air outlet opening. The device motor is located above the rotor in driving relation to a hollow rotor hub communicating with the rotor interior and is constructed for immersion in the liquid. A stator encircles the rotor and has two vertically spaced horizontal rings between which is arranged a plurality of non-radially inclined vertical guide or deflector plates, the outer diameter of the stator rings being from 2 to 5 times the outer diameter of the rotor, and the diameter of the locus of the distal ends of the guide plates being from 1.5 to 2.0 times the outer diameter of the rotor. A support structure, which includes a plurality of leveling screws resting on the tank bottom, is provided to mount the drive motor and the stator in such a way that a first space is left between them to enable liquid to flow therethrough in a controlled fashion into the inter-vane impeller chambers from above, and that a second space is left below the stator to enable liquid to enter the impeller chambers from below and to accommodate a section of the air intake duct which communicates at one end with the bottom end of the rotor hub via a labyrinth packing and at its other end extends up and out of the tank outside the confines of the stator.

12 Claims, 3 Drawing Figures

DEVICE FOR AERATING LIQUIDS

This invention relates to a self-aspirating device for aerating liquids, and in particular to such a device which can be submerged in its entirety in a mass of liquid located in a tank or like container which is open at the top but inaccessible from the bottom.

In German Pat. No. 1,667,042 there is described a self-aspirating device for aerating liquids, which includes a hollow, vaned rotor arranged near the bottom of a tank for rotation in a given direction about a vertical axis, and a surrounding stator. The rotor has from 4 to 8 vanes which are closed at their leading sides by means of respective vertical, imperforate plates oriented non-radially of the rotor so as to form acute angles with radial planes passing through the tips of the vanes, the vanes on their trailing sides being provided with respective air outlet openings disposed in vertical, generally radial planes. The rotor, which is provided along its outer periphery with an upper ring and a lower ring, is fixedly connected at its bottom to a drive shaft extending into the tank through the bottom thereof, and communicates at its top in an air-tight manner via a labyrinth packing with a stationary central air intake duct. The drive motor is located beneath the tank.

The stator surrounding the rotor has at least 12 vertical guide or deflection plates disposed between two flat horizontal rings or annular plates, each guide plate being oriented at an acute angle to the radial direction, and the locus of the inner edges of the guide plates being spaced from the rotor circumference i.e. from the locus of the tips of the rotor vanes, only by an amount sufficient to permit free rotation of the rotor. The guide plates are oriented so as to form with the radial planes extending through the innermost edges of the guide plates respective acute angles between 25° and 35°.

As the examples in the aforesaid German patent show, in a tank equipped with such an aerating device, it is possible to achieve a uniform aeration with an air intake ranging from about 50 m³/h up to about 200 m³/h at a specific power comsumption of 0.8 kwh/10 m³ of air when the tank is filled with liquid to a height of 3.2 m, and at a specific power consumption of 0.85 kwh/10 m³ of air when the tank is filled to height of 4.0 m.

In German Pat. No. 961,795 there is described a self-aspirating aerating device operating on the same principle, but in that system the drive of the vaned rotor is effected through the intermediary of an upwardly extending hollow shaft which simultaneously constitutes the air intake duct, with the drive motor being located exteriorly above the tank. The specific power consumption attainable by means of this aerating device, when arranged in a tank filled with liquid to a height of 3 m and delivering an aspirated quantity of air of 40 m³/h, is 1.20 kwh/10 m³ of air.

Both of the above-described known aerating devices are, of course, subject to certain limitations. Thus, since the first one is specifically designed to be used only where the tank is accessible from beneath, the tank must either be raised from the ground and supported on legs, or it must be located over a large hole in the ground, which poses no problem in the case of a metal tank but creates major engineering difficulties where the tank is made of concrete. The second described aerating device, on the other hand, being specifically designed to be driven by a motor located above and outside the tank, requires the provision of a long and powerful hollow drive shaft, which again raises substantial engineering difficulties, since the relative weakness of stainless steel (in effect the only structural material which can be used for this shaft) makes such a shaft construction impractical from a purely mechanical standpoint.

Basically, therefore, it is an important object of the present invention to provide a novel and improved self-aspirating aerating device which can be utilized in a tank or container open at the top but inaccessible from the bottom.

More specifically, it is an object of the present invention to provide such an aerating device which is designed to rest on the bottom of the tank; which can be driven by means of a standard trunk piston engine capable of being submerged in the liquid without requiring the use of a diving bell-like hood or cover; which can be driven without the use of either a long hollow drive shaft or a drive shaft extending through the tank bottom; which is sturdy, capable of being turned on and off relatively easily, and noiseless in operation; which is readily utilized for the aeration of waste water or sewage as well as other liquids; and which can effect a high degree of oxidation while operating at a specific power consumption below heretofore conventional levels.

Generally speaking, these objectives of the present invention are attained by means of an aerating device including a hollow vaned rotor located near the bottom of the tank for rotation about a vertical axis, the rotor having from 4 to 8 vanes which are provided at their trailing sides with respective air outlet openings facing counter to the direction of rotation of the rotor and are further provided at their leading sides and in advance of the air outlet openings (as viewed in the direction of rotation) with respective imperforate plates or walls arranged so as to make acute angles with radial planes passing through the tips of the vanes, and a stator surrounding the rotor and having at least 12 circumferentially spaced vertical guide or deflector plates fixedly arranged between two flat horizontal rings and oriented at respective acute angles to the radial direction. The rotor is connected at its top to the downwardly directed shaft of a trunk piston engine and communicates at its bottom through a labyrinth packing with a stationary air intake duct. The stator is secured to the flange of the engine housing by means of spacer bolts, and the entire device rests on adjustable feet constituted by a plurality of leveling screws.

In the aerating system disclosed in German Pat. No. 1,667,042, the outer diameter of the flat rings of the stator of the device is between about 1.5 and 2.0 times the outer diameter of the vaned rotor, and it is through this feature in conjunction with the arrangement of an upper ring and a lower ring on the vaned rotor that the specific power consumption of the aerator is reduced to the indicated levels thereof. In a raw sewage or waste water aeration system, however, the presence of these rotor rings gives rise to serious mechanical difficulties. It has, therefore, become essential that other means be found by which it would be feasible to equal the aforesaid indicated low specific power consumption levels and, if possible, to attain even lower levels.

The construction according to the present invention overcomes this potential drawback on the one hand by means of a precise dimensioning of the spacer bolts between the engine and the stator to ensure that the flow of the liquid into the aerating device, i.e. into the spaces between the vanes of the rotor, is so throttled that approximately the same specific power consumption is attained as through the use of rings on the rotor.

Over and above this, a further substantial reduction of the specific power consumption is rendered possible in accordance with one embodiment of the present invention by virtue of the fact that both of the flat rings of the stator have an outer diameter corresponding to between 2 and 5 times the outer diameter of the vaned rotor, while the guide plates of the stator terminate, i.e. their distal edges are disposed, along a locus having a diameter between 1.5 and 2.0 times the outer diameter of the vaned rotor. For purposes of mechanical stability, the two flat rings are additionally braced or stiffened near their outer periphery by means of vertical plates which are arranged in line with the respective ones of the guide plates.

When being placed into its operating environment, the entire device, which will hereinafter on occasion be referred to as an immersion aerator, is lowered into the tank for the liquid to be aerated until it rests on the bottom of the tank. Adjustable leveling screws are provided to enable the device to be positioned vertically. According to one embodiment of the invention, the leveling screws are mounted on a base plate which is fixedly secured to the lower stator ring located thereabove through the intermediary of a plurality of spacer plates or brackets. The latter simultaneously serve as stabilizing surfaces for the device and ensure that the space between the lower stator ring and the base plate is sufficient to enable the air intake duct to be extended laterally from its juncture with the rotor to a point beyond the confines of the stator. Rotary movement of the aerator in its fixed position is prevented by means of anchoring straps each secured at one end to the base plate and at the other end to a respective anchor bolt arranged in the tank. Power is led to the drive motor by means of a water-tight cable.

In accordance with another embodiment of the invention, the leveling screws are arranged at the lowermost extremities of a plurality of vertical support members which are extensions of the horizontal cross-members of a supporting framework which is fixed above the upper stator ring to the motor flange. In this arrangement, the vertical support members are located outside the periphery of the stator, and although the screws are preferably fixed to the bottom of the tank so as to prevent rotation of the device as a unit, the relatively large span of the supporting framework provides per se an especially stable means for positioning of the device on the tank bottom without any need for special anchoring means. As in the first-described embodiment, the stator is spaced from the tank bottom to an extent sufficient to accommodate the laterally extending section of the air intake duct.

In any aerating device according to the present invention, the main body of the air intake duct is located outside the confines of the flat rings of the stator and extends upwardly from the tank bottom, terminating exteriorly of the tank at one side thereof. Advantageously, to measure the aspirated quantity of air, a rotary flow meter is incorporated in the duct at the inlet end thereof. At the juncture between the rotor and the horizontal section of the air intake duct, of course, the labyrinth packing will inhibit sucking of the liquid into the hollow interior of the rotor, which, if permitted, would increase the power consumption of the aerator and reduce the aspirated quantity of air.

In the operation of an immersion aerator according to the present invention, the rotor is driven at a speed of about 1400 to 1750 rpm and freely sucks in air without the use of a compressor. The liquid to be aerated is drawn into the peripheral rotor chambers defined between the vanes of the rotor, both from above and below the latter, by virtue of the high speed rotation of the same. In the rotor chambers, the liquid is mixed with the aspirated air in the form of fine bubbles, the resultant mixture of fine bubbles and the liquid then being expelled by centrifugal force through the space between the flat rings of the stator.

Waste water or sewage frequently contains small particles of solids, pebbles or sand, which are not always previously duly or fully separated therefrom. It is, therefore, frequently necessary that steps be taken to protect the rotor and the stator from damage which could result if such particles should happen to get into the narrow space between the tip edge of one of the rotor vanes and the proximate end edge of one of the stator guide plates past which that vane may be moving at that instant. Merely by way of example, in an aerating device according to the present invention this protection is rendered possible by the positioning of an upper screen cylinder around the space defined above the stator by the spacer bolts, and a lower screen cylinder around the space defined below the stator by the spacer plates or brackets.

The foregoing and other objects, characteristics and advantages of the present invention will be more clearly understood from the following detailed description thereof when read in conjunction with the accompanying drawings, in which.

Figure 1:
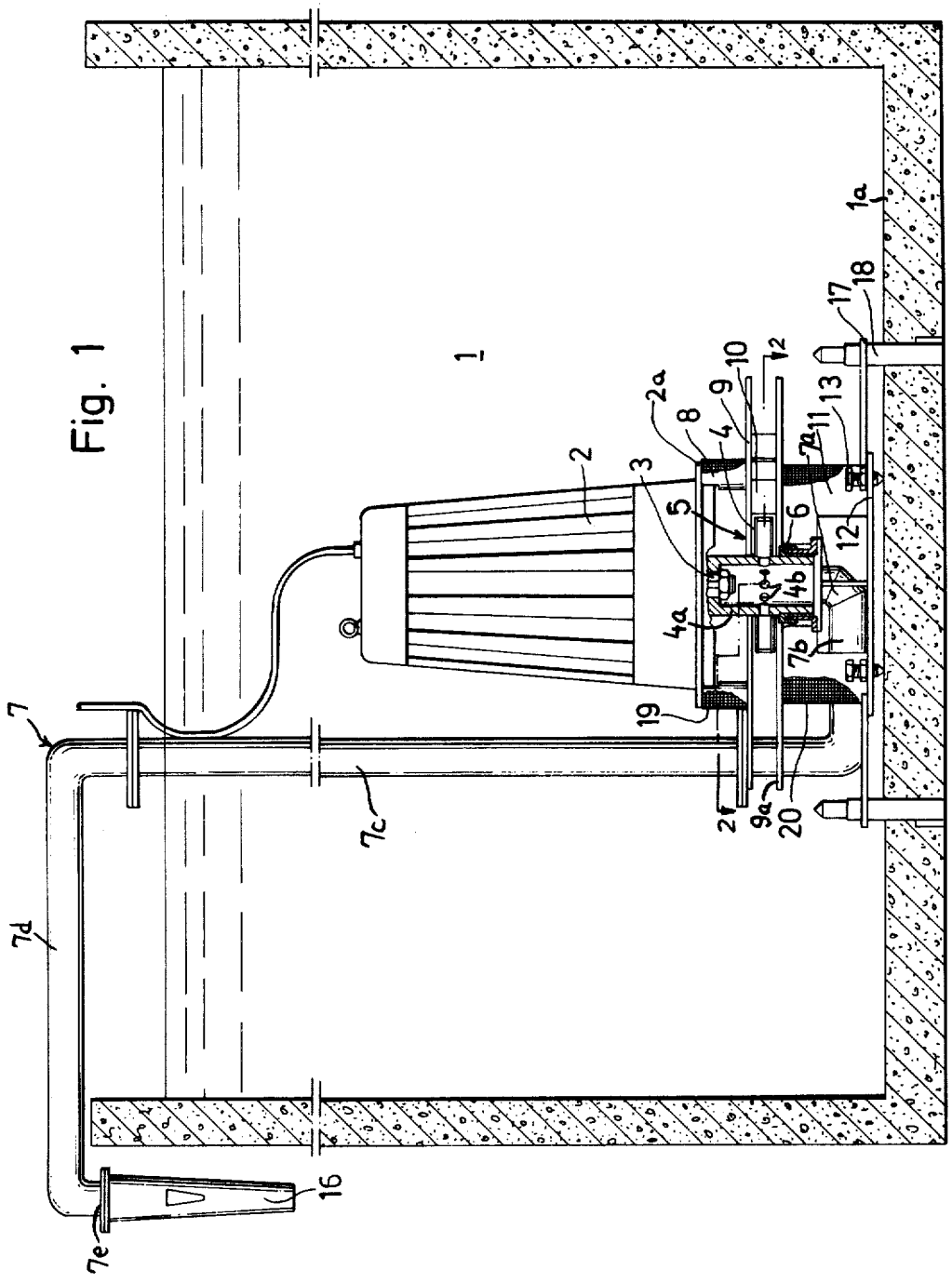
FIG. 1 is a fragmentary, partly schematic, vertical section through a concrete tank having an immersion aerator according to one embodiment of the invention arranged therein.
Figure 2:
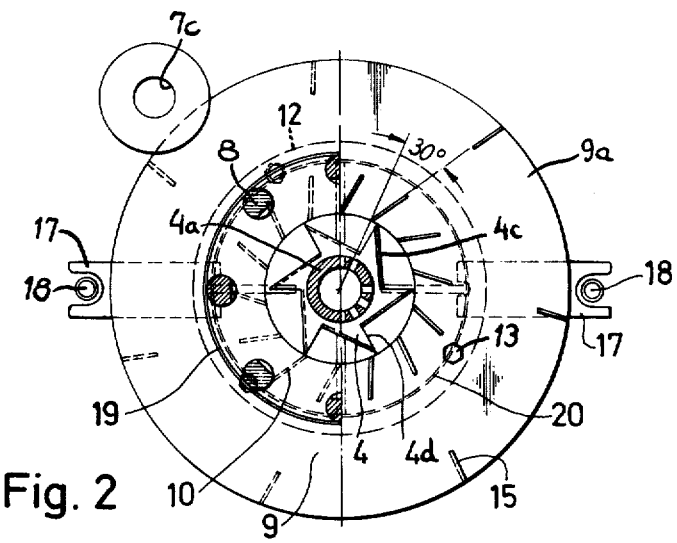
FIG. 2 is a fragmentary sectional view taken along the line 2—2 in FIG. 1.

Referring now first to FIGS. 1 and 2, an aerating device according to one embodiment of the invention is there shown as being arranged in a concrete tank 1. The shaft 3 of a drive motor 2, which is preferably a standard trunk piston engine, supports a vaned rotor 4 through the intermediary of a hollow tubular hub 4a which is peripherally perforated at 4b at the level of the rotor. At its lowermost end, the hub communicates in a fluid-tight manner via a labyrinth packing 6 with the discharge end section 7a of an air intake duct 7. The latter also has a horizontal section 7b which extends outwardly from the discharge end section 7a, a vertical section 7c which extends upwardly from the section 7b to a point above the tank, and a further horizontal section 7d which extends to the side of the tank and is provided at its air inlet end 7e exteriorly of the tank with a flow meter 16. The air inlet end of the duct 7 thus is so located that the sucking in of waste air rising out of the tank is effectively inhibited. In the illustrated representative construction, the rotor 4, which is imperforate at both its top and bottom surfaces, has 6 vanes, each including at its leading side facing in the direction of rotation of the rotor (clockwise as seen in FIG. 2) an imperforate vertical impeller surface 4c, and at its trailing side facing counter to the direction of rotation an air outlet opening 4d, the planes of these openings being oriented radially of the rotor, and each of the impeller surfaces being inclined non-radially of the rotor away from the direction of rotation so as to make an angle of 30° with a radial plane passing through the outer or vane apex edge of that impeller surface. Each vertical impeller surface thus trails a respective one of the air outlet openings in the direction of rotation and forms with that preceding outlet opening an impeller chamber which is open from above and below for admitting liquid thereinto to be mixed with the air flowing out from the rotor interior through that outlet opening.

The rotor is surrounded by a stator 5 which includes two vertically spaced horizontal flat rings 9 and 9a and therebetween, in the illustrated construction, 14 vertical guide or deflector plates 10 each of which is inclined non-radially of the rotor/stator combination in the direction of rotation so as to make an angle of 30° with a radial plane passing through the innermost edge of that guide plate. The outermost edges of the guide plates are disposed along a locus the diameter of which is 1.6 times the outer diameter of the vaned rotor 4 (i.e. the diameter of the locus of the vane apex edges of the rotor). The innermost edges of the stator rings 9–9a and of the guide plates 10 are spaced from the rotor just sufficiently not to hinder the rotation thereof. Adjacent the outer periphery of the stator 5 there are provided, for purposes of stability, 7 stiffening plates 15 which are welded to the rings 9 and 9a intermediate the same, in coplanar relationship with alternate ones of the guide plates 10. The outer diameter of each of the stator rings is 3 times the outer diameter of the rotor.

The stator 5 is secured to the flange 2a of the housing of the drive motor 2 by means of suitable spacer members 8 (e.g. bolts and sleeves) interconnecting the flange 2a and the upper stator ring 9. The stator is further secured to a base plate 12 located therebelow, through the intermediary of spacer plates or brackets 11 interconnecting the lower stator ring 9a and the base plate. Arranged in the latter are 3 leveling screws or feet 13 by means of which the device rests on the tank bottom 1a and can be adjusted so as to have its axis of rotation disposed precisely vertically. Such an adjustment capability is, of course, essential in concrete tanks which are frequently characterized by slanted bottoms. To prevent rotation of all parts of the device other than the vaned rotor, suitable arms or straps 17 are provided, each being bolted or otherwise secured at one end to the plate 12 and at the other end being bifurcated and embracing a respective anchor bolt 18 molded in place in the bottom of the tank.

A cylindrical screen 19 is arranged in surrounding relation to the space defined by the spacer bolts 8 between the motor flange 2a and the upper stator ring 9, and a second cylindrical screen 20 is arranged in surrounding relation to the space defined by the spacer brackets 11 between the lower stator ring 9a and the plate 12. The mesh size of these screens is selected to be smaller than the spacing of the tips or apexes of the rotor vanes from the inner edges of the guide plates 10. By way of example, in the illustrated construction the spacing of the rotor vane apexes from the inner edges of the guide plates is 1 mm and the mesh size is 0.7 mm. Any access for solid particles capable of becoming jammed between the rotor vane apexes and the stator guide plates thus is effectively prevented.

Figure 3:
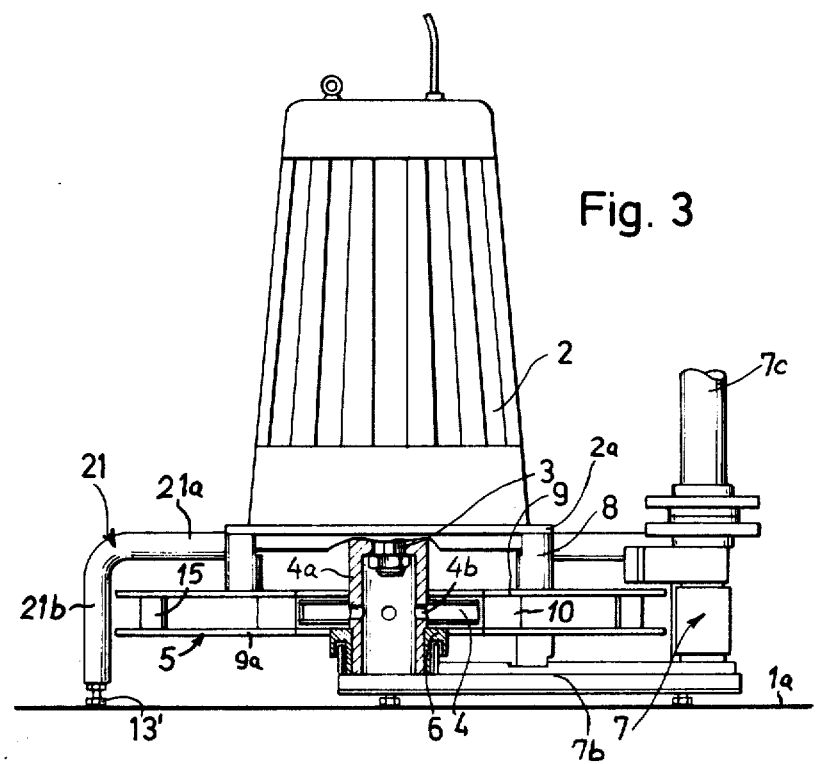
FIG. 3 is a fragmentary vertical section through an immersion aerator according to another embodiment of the present invention, the tank being omitted except for a diagrammatic representation of the bottom thereof.

In the embodiment of the invention illustrated in FIG. 3, the immersion aerator, as before, includes a motor 2 to the shaft 3 of which the vaned rotor 4 is secured through the intermediary of a hollow, apertured, downwardly extending hub 4a, with the latter being in communication with the air intake duct 7 by means of a labyrinth packing 6. Likewise, the upper ring 9 of the stator 5 is connected to the flange 2a of the motor by means of the spacer bolts 8. For the purpose of enabling the device to be properly positioned and immobilized on the tank bottom, however, there is provided a supporting framework 21 which consists of at least three cross-members 21a which are suitably braced relative to one another and are integral at their outermost extremities with respective vertical columns or legs 21b extending down to the bottom of the tank exteriorly of the stator. The framework 21 is rigidly secured to the motor flange 2a and together with the entire device rests on suitable leveling screws 13' which are adjustably secured to the bottom ends of the supporting framework members 21b and are preferably fixed to the tank bottom 1a.

As an illustrative example, an immersion aerator according to the present invention, having a vaned rotor with an outer diameter of 200 mm and a height of 24 mm and located within stator rings having an outer diameter of 310 mm, with the rotor being submerged under water in a tank filled to a height of 4 m and running at a rotational speed of 1450 rpm, aspirates 74 $m^3/h$ of air at a power consumption of 6.7 kw. The specific power consumption thus is 0.90 kwh/10 $m^3$. In an aerator in which the outer diameter of the two stator rings is 610 mm, with all other parameters being the same as above, the aspiration rate is 89 $m^3/h$ of air and requires a power consumption only 6.4 kw. In this case, the specific power consumption is reduced to 0.72 kwh/10 $m^3$.

As another example of the invention, when an aerator having stator rings with an outer diameter of 310 mm is run under a liquid height of only 3 m of water, the other parameters being as set forth above, the specific power consumption is 0.64 kwh/10 $m^3$. When the stator rings have an outer diameter of 610 mm, the specific power consumption drops to 0.52 kwh/10 $m^3$.

These examples illustrate that when the tank is filled to a height of 3 m, which is preferred in sewage or waste water aeration processes, the construction according to the present invention makes it possible, even where the stator ring outer diameter is as little as 1.55 times the rotor outer diameter, to achieve a substantial reduction of the specific power consumption with respect to that capable of being achieved by a construction according to German Pat. No. 1,667,042, and they further illustrate that the specific power consumption is still further improved by expansion of the stator rings to an outer diameter of 3.05 times the outer rotor diameter.

As a result of the fine and uniform distribution of the air bubbles in the liquid resulting from the operation of an aerating device according to the present invention, a high utilization of oxygen, exceeding 40% and ranging up to about 90%, is achieved, and this leads to a heretofore unattainably high oxygen intake of between about 2.5 and about 5.0 kg of oxygen per kwh. The immersion aerator is adapted for the aeration of waste water, especially waste water with a high $BOD_5$ rating (biological oxygen demand, i.e. the amount of oxygen needed to satisfy the biochemical oxydation requirements of pollutants, over a period of 5 days). The device works practically noiselessly, since it is entirely immersed in water. This constitutes an especial advantage relative to those systems known in the art which use extremely noisy compressors for compression of the air. The aerator can be turned on and off very easily, which makes possible a simple variation of the oxygen intake while maintaining optimum loading conditions. The device according to the invention is, however, especially suited for continuous operation. Moreover, the fact that the entire motor heat is absorbed by the waste water renders the device especially advantageous for use in winter. The reaction temperature of the waste water then does not drop too far, and the optimum temperature for the microorganisms is approximately maintained. Also, the danger of the water freezing is eliminated.

An immersion aerator according to the present invention is also found to be well suited for use in metal (e.g. stainless steel) tanks or containers and for the performance of other types of chemical gas-liquid reactions in closed containers, even under pressure, for example, such as yeast fermentations, acetic acid production, etc. For use in any such environment, of course, all exposed parts of the device must be made of structural materials having the requisite resistance to corrosion or chemical attack.

It should be noted that, except for differences expressly indicated in this application, the structural, dimensional and operational characteristics of the aerating devices according to the present invention correspond to the respective characteristics of the aerating devices disclosed in our prior copending application Ser. No. 259,693 filed June 5, 1972, now U.S. Pat. No. 3,813,086 issued May 28, 1974, and to the extent applicable the disclosures of that application are, therefore, hereby incorporated herein by this reference.

It will be understood that the foregoing description of preferred embodiments of the present invention is for purposes of illustration only, and that the various structural and operational features herein disclosed are susceptible to a number of modifications and changes none of which entails any departure from the spirit and scope of the present invention as defined in the hereto appended claims.

What is claimed is:

1. A device for aerating liquids, which device includes a hollow vaned rotor arranged near the bottom of a tank or container for rotation about a vertical axis, a stator encircling said rotor, and a drive motor for rotating said rotor, the latter having from 4 to 8 vanes, each vane being provided at its trailing side with an air outlet opening facing away from the direction of rotation of the rotor and at its leading side with a vertical imperforate impeller facing in in the direction of rotation and inclined non-radially away from said direction so as to form an acute angle with a radial plane extending through the apex edge of that vane, said rotor thereby having a like plurality of peripherally spaced chambers defined between successive vanes and each open at both its top and its bottom, and the stator having 2 vertically spaced, flat horizontal rings and at least 12 vertical guide plates secured between said rings at peripherally spaced locations and each inclined non-radially of the rotor/stator combination so as to form an acute angle with a radial plane passing through the innermost edge of that guide plate; the improvement wherein a. said rotor has a vertical, downwardly open, tubular hub the interior of which is in communication with the interior of said rotor;

b. said drive motor is constructed for immersion in the liquid being aerated, is positioned above said rotor and in close proximity thereto, and has a short output shaft drivingly connected to said hub;

c. spacer means are interposed between and rigidly connected to both the upper one of said stator rings and an adjunct of the superposed housing of said drive motor, thereby to provide above said rotor between said upper stator ring and said drive motor housing a space of predetermined height through which liquid can flow in a controlled manner to enter from above into said chambers defined between said rotor vanes;

d. a stationary air intake duct which has an intake end located exteriorly of said tank or container and laterally adjacent thereto extends from there into said tank or container and then first downwardly to a level below that of said rotor and then transversely over to the lowermost end of said hub, said air intake duct at its discharge end is in communication with the interior of said hub, and a labyrinth packing or like rotary coupling establishes a liquid-tight seal between said hub and said discharge end of said air intake duct; and e. a supporting structure for the entire device is provided with a plurality of leveling screws resting on the bottom of said tank or container, said supporting structure being constructed and arranged to dispose the lower one of said stator rings so as to leave sufficient space therebelow to accommodate the transverse section and the discharge end section of said air intake duct and to permit liquid to enter from below into said chambers.

2. A device as claimed in claim 1, wherein said supporting structure comprises a base plate located below said lower stator ring, and a plurality of brackets interposed between and rigidly connected to both said base plate and said lower stator ring, said transverse section and said discharge end section of said air intake duct are accommodated in the space defined between said base plate and said lower stator ring, and said leveling screws are mounted in said base plate.

3. A device as claimed in claim 2, wherein a plurality of anchor bolts is secured to the bottom of said tank or container, and a plurality of immobilizing straps is provided, each strap being rigidly connected at one end to said base plate and secured at the other end to a respective one of said anchor bolts.

4. A device as claimed in claim 1, wherein said supporting structure comprises a framework rigidly connected to said adjunct of said housing of said drive motor and having a plurality of legs disposed outside the confines of said stator, and said leveling screws are connected to said legs of said framework.

5. A device as claimed in claim 4, wherein each of said leveling screws is threaded at one end into the lowermost extremity of a respective one of said legs of said framework and is anchored at its other end to the bottom of said tank or container.

6. A device as claimed in claim 1, wherein the outer diameter of said stator rings is between 2 and 5 times the outer diameter of said rotor, and the distal edges of said guide plates are disposed along a locus the diameter of which is between 1.5 and 2.0 times the outer diameter of said rotor.

7. A device as claimed in claim 6, wherein said supporting structure comprises a base plate located below said lower stator ring, and a plurality of brackets interposed between and rigidly connected to both said base plate and said lower stator ring, said transverse section and said discharge end section of said air intake duct are accommodated in the space defined between said base plate and said lower stator ring, and said leveling screws are mounted in said base plate.

8. A device as claimed in claim 6, wherein said supporting structure comprises a framework rigidly connected to said adjunct of said housing of said drive motor and having a plurality of legs disposed outside the confines of said stator, and said leveling screws are connected to said legs of said framework.

9. A device as claimed in claim 1, wherein a first cylindrical screen is arranged about and encloses the space between said adjunct of said drive motor housing and said upper stator ring, and a second cylindrical screen is arranged about and encloses the space below said lower stator ring, the mesh size of said screens being less than the width of the gap between the locus of the vane apexes and the locus of the innermost edges of said guide plates.

10. A device as claimed in claim 9, wherein the outer diameter of said stator rings is between 2 and 5 times the outer diameter of said rotor, and the distal edges of said guide plates are disposed along a locus the diameter of which is between 1.5 and 2.0 times the outer diameter of said rotor.

11. A device as claimed in claim 9, wherein said supporting structure comprises a base plate located below said lower stator ring, and a plurality of brackets interposed between and rigidly connected to both said base plate and said lower stator ring, said transverse section and said discharge end section of said air intake duct are accommodated in the space defined between said base plate and said lower stator ring, said leveling screws are mounted in said base plate, and said second cylindrical screen is interposed between said lower stator ring and said base plate.

12. A device as claimed in claim 11, wherein the outer diameter of said stator rings is between 2 and 5 times the outer diameter of said rotor, and the distal edges of said guide plates are disposed along a locus the diameter of which is between 1.5 and 2.0 times the outer diameter of said rotor.

* * * * *